United States Patent
Harada et al.

(10) Patent No.: US 9,802,262 B2
(45) Date of Patent: Oct. 31, 2017

(54) THREAD-FORMING TAP

(75) Inventors: Kazumitsu Harada, Toyokawa (JP); Hironori Yamamoto, Toyokawa (JP); Toshihiro Satoh, Toyokawa (JP)

(73) Assignee: OSG Corporation, Toyokawa (JP)

( * ) Notice: Subject to any disclaimer, the term of this patent is extended or adjusted under 35 U.S.C. 154(b) by 397 days.

(21) Appl. No.: 14/401,745

(22) PCT Filed: Jun. 22, 2012

(86) PCT No.: PCT/JP2012/066062
§ 371 (c)(1),
(2), (4) Date: Nov. 17, 2014

(87) PCT Pub. No.: WO2013/190700
PCT Pub. Date: Dec. 27, 2013

(65) Prior Publication Data
US 2015/0158102 A1    Jun. 11, 2015

(51) Int. Cl.
*B23G 5/06* (2006.01)
*B23G 7/02* (2006.01)

(52) U.S. Cl.
CPC ............... *B23G 5/06* (2013.01); *B23G 7/02* (2013.01); *B23G 2200/46* (2013.01)

(58) Field of Classification Search
CPC . B23G 5/06; B23G 5/062; B23G 7/02; B23G 2200/46
See application file for complete search history.

(56) References Cited

U.S. PATENT DOCUMENTS

| | | | |
|---|---|---|---|
| 2003/0078109 A1 | 4/2003 | Hikosaka et al. | |
| 2006/0121995 A1* | 6/2006 | Glimpel | B23G 5/18 470/204 |
| 2008/0268967 A1 | 10/2008 | Nakajima et al. | |

(Continued)

FOREIGN PATENT DOCUMENTS

| CN | 101336144 A | 12/2008 |
|---|---|---|
| CN | 201776537 U | 3/2011 |

(Continued)

OTHER PUBLICATIONS

Jun. 23, 2016 Office Action issued in Chinese Patent Application No. 201280074144.0.

(Continued)

*Primary Examiner* — Debra Sullivan
(74) *Attorney, Agent, or Firm* — Oliff PLC

(57) ABSTRACT

A thread forming tap includes a screw thread formed into a male thread shape with margin portions disposed to project in radial direction and relief portions having a diameter smaller than the margin portions, the margin portions and relief portions alternatively arranged and, thread forming tap causes the margin portions of the screw thread to cut into a surface layer portion of a prepared hole formed in a work to plastically deform the surface layer portion to form a female thread, margin portions are formed into a ridge line shape with a width dimension of zero at least at a thread bottom of the screw thread, and margin portions are formed into a ridge line shape with a width dimension of zero in a range from a thread bottom of the screw thread to a position between the thread bottom and an effective diameter position of the screw thread.

7 Claims, 5 Drawing Sheets

(56) References Cited

U.S. PATENT DOCUMENTS

2009/0011844 A1  1/2009 Osawa et al.
2011/0020087 A1  1/2011 Yamamoto et al.

FOREIGN PATENT DOCUMENTS

| CN | 102145418 A | 8/2011 | |
|---|---|---|---|
| CN | 202123294 U | 1/2012 | |
| DE | 34 19 850 A1 | 11/1985 | |
| DE | 102005010543 A1 * | 9/2006 | ............... B23G 5/18 |
| JP | A-2003-127027 | 5/2003 | |
| JP | A-2004-276085 | 10/2004 | |
| JP | 2006-198685 A | 8/2006 | |
| WO | WO 2006/117850 A1 | 11/2006 | |
| WO | WO 2007/086112 A1 | 8/2007 | |

OTHER PUBLICATIONS

International Search Report issued in PCT/JP2012/066062 dated Jul. 17, 2012.
Feb. 25, 2016 Extended Search Report issued in European Patent Application No. 12879458.3.

* cited by examiner

| SAMPLE NO. | HELIX ANGLE $\beta$ | THREAD-BOTTOM MARGIN WIDTH | TAPPED HOLE NUMBER | (HOLE) | DURABILITY RATIO | DURABILITY LIMIT |
|---|---|---|---|---|---|---|
| 1 | 0° | AIMED AT 1° | 5980 6058 | $\bar{X} = 6109$ | 100% | GP-OUT |
| 2 | 0° | AIMED AT 0° | 6241 6176 | $\bar{X} = 6209$ | 103.2% | GP-OUT |
| 3 | −1.5° | AIMED AT 0° | 6467 6560 | $\bar{X} = 6514$ | 108.2% | GP-OUT |
| 4 | −3° | AIMED AT 0° | 6977 6890 | $\bar{X} = 6934$ | 115.2% | GP-OUT |
| 5 | −3° | AIMED AT 1° | 6350 6103 | $\bar{X} = 6227$ | 103.4% | GP-OUT |
| 6 | −4.5° | AIMED AT 0° | 6530 6700 | $\bar{X} = 6615$ | 109.9% | GP-OUT |
| 7 | −6° | AIMED AT 0° | 6134 6256 | $\bar{X} = 6195$ | 102.9% | GP-OUT |

| SAMPLE NO. | HELIX ANGLE β | FIRST HOLE | SECOND HOLE | THIRD HOLE | FOURTH HOLE | FIFTH HOLE | AVERAGE | PROPORTION (%) |
|---|---|---|---|---|---|---|---|---|
| 1 | 0° | 1644 | 1646 | 1650 | 1648 | 1649 | 1647 | 100 |
| 2 | −1.5° | 1640 | 1642 | 1640 | 1638 | 1642 | 1640 | 99.6 |
| 3 | −3° | 1639 | 1641 | 1635 | 1640 | 1638 | 1639 | 99.5 |
| 4 | −4.5° | 1640 | 1645 | 1643 | 1640 | 1645 | 1643 | 99.7 |
| 5 | −6° | 1655 | 1658 | 1660 | 1665 | 1660 | 1660 | 100.8 |

THREAD-FORMING TAP

TECHNICAL FIELD

The present invention relates to a thread forming tap plastically deforming a surface layer portion of a prepared hole to form female threads and particularly to an improvement for reducing a working torque and increasing a tool life.

BACKGROUND ART

A thread forming tap is known that includes screw threads formed into a male thread shape with margin portions disposed to project in a radial direction and relief portions having a diameter smaller than the margin portions alternatively arranged and that causes the margin portions of the screw threads to cut into a surface layer portion of a prepared hole formed in a work to plastically deform the surface layer portion so as to form female threads. A technique for reducing a working torque and increasing a tool life is proposed for such a thread forming tap. For example, this corresponds to a torque reductive thread forming tap described in Patent Document 1. According to this technique, it is considered that a weak relief portion is disposed on a portion corresponding to the margin portions to realize a thread forming tap with a working torque reduced to extend a tool life.

PRIOR ART DOCUMENT

Patent Document

Patent Document 1: Japanese Laid-Open Patent Publication No. 2004-276085

SUMMARY OF THE INVENTION

Problem to be Solved by the Invention

However, the conventional technique as described above cannot sufficiently reduce the working torque and has a limitation in increasing the tool life. Therefore, it is requested to develop a thread forming tap further reducing the working torque and increasing the tool life.

The present invention was conceived in view of the situations and it is therefore an object of the present invention to provide a thread forming tap reducing a working torque and increasing a tool life.

Means for Solving the Problem

To achieve the object, the first aspect of the present invention provides a thread forming tap including a screw thread formed into a male thread shape with margin portions disposed to project in a radial direction and relief portions having a diameter smaller than the margin portions, the margin portions and the relief portions being alternatively arranged and, the thread forming tap causing the margin portions of the screw thread to cut into a surface layer portion of a prepared hole formed in a work to plastically deform the surface layer portion so as to form a female thread, the margin portions being formed into a ridge line shape with a width dimension of zero at least at a thread bottom of the screw thread.

Effects of the Invention

As described above, according to the first aspect of the invention, the thread forming tap includes the screw threads formed into a male thread shape with the margin portions disposed to project in a radial direction and the relief portions having a diameter smaller than the margin portions alternatively arranged and causes the margin portions of the screw threads to cut into a surface layer portion of a prepared hole formed in a work to plastically deform the surface layer portion so as to form female threads, and the margin portions are formed into a ridge line shape with a width dimension of zero at least at the thread bottom of the screw threads and, therefore, a contact area with a work can be suppressed smaller at the time of machining to realize a reduction in working torque and an increase in tool life. Thus, the thread forming tap reducing the working torque and increasing the tool life can be provided.

The second aspect of the present invention provides the thread forming tap recited in the first aspect of the invention, wherein the margin portions are formed into a ridge line shape with a width dimension of zero in a range from a thread bottom of the screw thread to a prescribed position between the thread bottom and an effective diameter position of the screw thread. Consequently, a contact area with a work can further be suppressed smaller at the time of machining to realize a reduction in working torque and an increase in tool life in a practical form.

The third aspect of the present invention provides the thread forming tap recited in the first or second aspect of the invention, wherein the margin portions are disposed with a helix angle $\beta$ in a direction opposite to a twisting direction of the screw thread relative to an axial center of the screw thread, and wherein the helix angle $\beta$ is within a range of $0.5\alpha \leq \beta \leq 1.5\alpha$ when a lead angle of the screw thread is $\alpha$. Consequently, a contact area with a work can further be suppressed smaller at the time of machining to realize a reduction in working torque and an increase in tool life in a practical form.

The fourth aspect of the present invention provides the thread forming tap recited in the third aspect of the invention depending on the first or second aspect of the invention, wherein the helix angle $\beta$ is equal to the lead angle $\alpha$ of the screw thread. Consequently, a contact area with a work can further be suppressed smaller at the time of machining to realize a reduction in working torque and an increase in tool life in a practical form.

MODES FOR CARRYING OUT THE INVENTION

The screw threads preferably form a substantially polygonal-shaped cross section when viewed in the axial center direction, and the positions corresponding to the vertexes of the polygonal shape are disposed to project in a radial direction as the margin portions while relief portions with a diameter smaller than the margin portions are disposed between the margin portions. For example, the screw threads form a substantially rectangle-shaped cross section when viewed in the axial center direction, and the positions corresponding to the four vertexes of the rectangle shape are disposed to project in a radial direction as the margin portions. Therefore, the margin portions at four locations are circumferentially disposed to project in a radial direction; however, for example, the screw threads may form a substantially triangle-shaped cross section when viewed in the axial center direction and the margin portions at three locations may circumferentially be disposed to project in a radial direction. Alternatively, the margin portions at five or more locations may circumferentially be disposed to project in a radial direction.

The thread forming tap preferably has an oil groove for supplying oil to a working portion at the time of tapping using the thread forming tap and the oil groove is formed in an outer circumferential portion of the screw threads in substantially parallel to the axial center. This oil groove is preferably formed in a thread forming tap having a relatively large diameter and may not necessarily be formed in a thread forming tap having a relatively small diameter.

The thread forming tap preferably includes a circular column-shaped shank portion, and a tap portion disposed concentrically to the shank portion on the tip side of the shank portion. This tap portion is preferably formed integrally with the shank portion; however, the tap portion may detachably be disposed and may be attached to and used with the shank portion at the time of tapping using the thread forming tap. The thread forming tap is preferably used while the shank portion is attached to a tapping machine.

A preferred embodiment of the present invention will now be described in detail with reference to the drawings. For convenience of description, the drawings used in the following description are not necessarily precisely depicted in terms of dimension ratio etc. of portions.

First Embodiment

Figure 1:
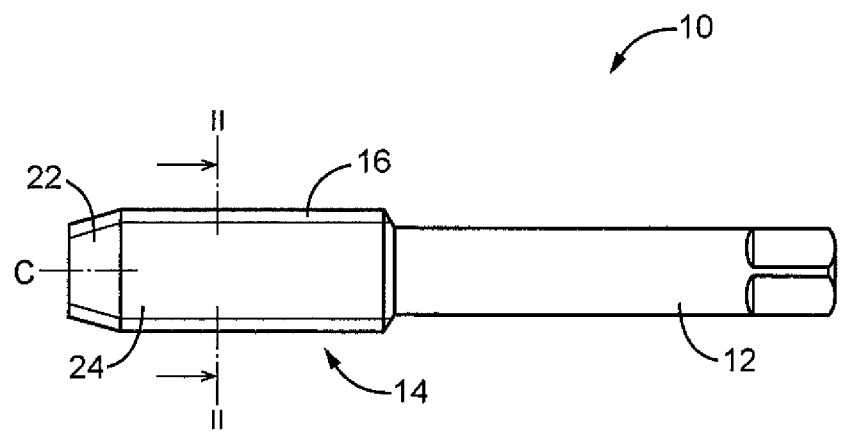
FIG. 1 is a front view for explaining a configuration of a thread, forming tap that is an embodiment of the present invention.
Figure 2:
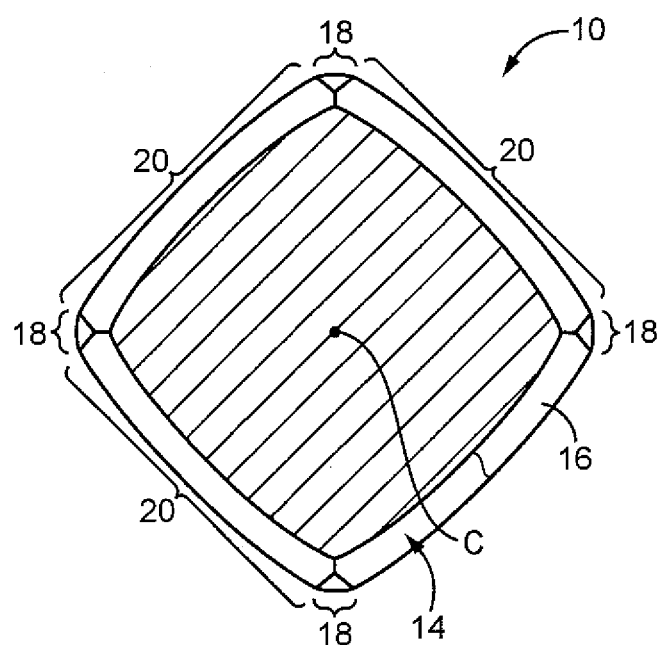
FIG. 2 is a cross-sectional view when a portion of the thread forming tap depicted in FIG. 1 is cut by a plane including an axial center.

FIG. 1 is a front view for explaining a configuration of a thread forming tap 10 that is an embodiment of the present invention, and FIG. 2 is a cross-sectional view when a portion of the thread forming tap 10 is cut by a plane including an axial center C (a cross-sectional view taken along II-II depicted in FIG. 1). As depicted in FIGS. 1 and 2, the thread forming tap 10 of this embodiment includes a circular column-shaped (cylindrically-shaped) shank portion 12, and a tap portion 14 integrally formed on the tip side of the shank portion 12 concentrically (on the common axial center C) to the shank portion 12. The tap portion 14 has screw threads (male threads) 16 formed on the outer circumferential side and the screw threads 16 correspond to female threads to be machined (female threads to be machined by the thread forming tap 10). The tap portion 14 is preferably formed integrally with the shank portion 12; however, the tap portion 14 may detachably be configured for the shank portion 12. In such a form, the tap portion 14 is integrally fixed to a tip portion of the shank portion 12 when used in machining of the female threads by the thread forming tap 10.

Figures 3, 4:
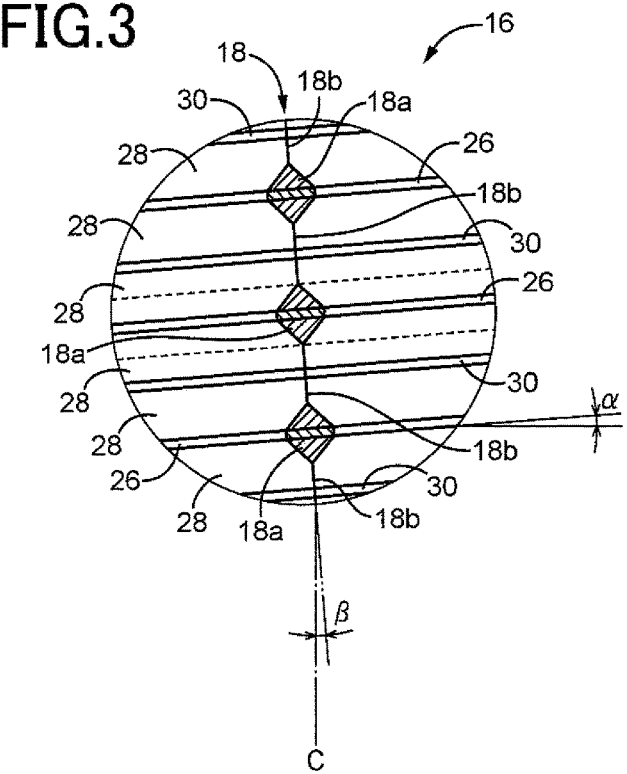
FIG. 3 is an enlarged front view of a portion of screw threads of the thread forming tap depicted in FIG. 1 for explaining a configuration thereof in detail.
FIG. 4 is a diagram of helix angles and thread-bottom margin widths of samples used in a tapping durability comparison test conducted by the present inventors together with a test result corresponding to each of the samples.

The screw threads 16 are formed into a male thread shape along a helix corresponding to a prescribed lead angle with margin portions 18 disposed to project in a radial direction and relief portions 20 having a diameter smaller than the margin portion 18 alternatively arranged. These margin portions 18 correspond to portions cutting into a prepared hole (a surface layer portion) of a work in the machining of the female threads by the thread forming tap 10. In other words, the margin portions 18 correspond to acting parts for plastically deforming a prepared hole of a work in the machining of the female threads by the thread forming tap 10 and are projecting portions (lands) disposed to project in a radial direction in accordance with a shape of the female threads to be machined. For example, as depicted in FIG. 2, the screw threads 16 form a substantially rectangle-shaped cross section (viewed cross section) when viewed in the axial center C direction, and the positions corresponding to the four vertexes of the rectangle shape are formed to project in a radial direction as the margin portions 18 while relief portions 20 having a diameter smaller than the margin portions 18 are disposed between the margin portions 18. As depicted in FIG. 3 described later, the margin portions 18 adjacent in the axial center C direction are coupled to each other by a configuration formed into a ridge line shape.

As depicted in FIG. 1, the tap portion 14 includes a chamfer portion 22 formed into a tapered shape with a radial dimension gradually reduced toward the tip side (with a diameter made smaller toward the tip side), and a complete thread portion 24 formed into a circular column shape (cylindrical shape) with a substantially constant radial dimension. The chamfer portion 22 is a portion for cutting into a surface layer portion of a prepared hole in a work and plastically deforming the surface layer portion to form female threads by form-rolling in the machining of the female threads by the thread forming tap 10, and corresponds to a configuration of several threads (e.g., two to eight threads) from the tip side of the screw threads 16. The complete thread portion 24 is a portion for finishing thread surfaces of the female thread formed by the chamfer portion 22 and improving guidance or a self-guiding property of the tap portion 14 in the machining of the female threads by the thread forming tap 10. The complete thread portion 24 is formed into a shape substantially identical to the shape of screw threads of the female threads to be machined by the thread forming tap 10. Although not particularly described in this embodiment, the tap portion 14 may have one or more oil grooves formed in the axial center C direction.

The thread forming tap 10 configured as described above causes the margin portions 18 of the screw threads 16 to cut into a surface layer portion of a prepared hole of a work for forming (thread forming) and machining of female threads through plastic deformation of the surface layer portion. For example, the thread forming tap 10 is attached at the shank portion 12 to a tapping machine and lead feed is performed in an axial direction while the shank portion 12 is rotationally driven, for example, clockwise when viewed from the shank portion 12, relative to the prepared hole that is an object of formation of female threads, thereby screwing the tap portion 14 disposed on the tip side of the shank portion 12 into the prepared hole. As a result, the chamfer portion 22 cuts into a surface layer portion (an inner circumferential surface) of the prepared hole and plastically deforms the surface layer portion to form the female threads by form-rolling, and the complete thread portion 24 finishes the formed female thread surfaces, so as to form the intended female threads in the prepared hole. Such machining by the thread forming tap 10 is preferably applied to formation of female threads in material excellent in ductility and can advantageously form highly accurate female threads without generating chips although a relatively large torque is applied to the thread forming tap 10 during formation of the female threads.

FIG. 3 is an enlarged front view of a portion of the screw threads 16 of the tap portion 14 for explaining a configuration thereof in detail. In FIG. 3, for convenience of description, the margin portions 18 of the screw threads 16 are indicated by areas of diagonal lines from upper right to lower left. As depicted in FIG. 3, the margin portion 18 reaches from a thread top 26 of the screw thread 16 through a flank 28 to a thread bottom 30 and further reaches through a flank 28 of the adjacent screw thread 16 to a thread top 26, and the margin portions 18 on the screw threads 16 adjacent to each other are coupled to each other by the configuration formed into a ridge line shape. In other words, in the screw threads 16 adjacent to each other, a projecting portion (land) formed to project in a radial direction is configured into a shape like a continuous ridge (mountain ridge line) extended in substantially parallel with the axial center C (preferably at a prescribed helix angle β as described later).

As depicted in FIG. 3, the margin portion 18 has a mountain ridge portion 18a defined from the thread top 26 to a prescribed position in the flank 28 (position corresponding to a prescribed radial dimension) with a width dimension in a direction perpendicular to an extending direction of the margin portion 18 (direction indicated by a dashed-two dotted line of FIG. 3). The mountain ridge portion 18a is configured with a width dimension gradually increased at a position closer to the thread top 26. The margin portion 18 has a ridge line portion 18b defined from the prescribed position to the thread bottom 30 without a width dimension (with a width dimension of zero) in a direction perpendicular to the extending direction of the margin portion 18. Therefore, the margin portion 18 is formed into a ridge line shape with a width dimension of zero at least at the thread bottom 30 of the screw thread 16. In other words, the margin portions 18 are configured such that the mountain ridge portions 18a of the respective screw threads 16 are coupled to each other by the ridge line portions 18b without a width dimension, and the ridge line portions 18b have a width dimension set to zero in the direction perpendicular to the extending direction. The margin portion 18 (the ridge line portion 18b) having a width dimension of zero (without a width dimension) means that a width of a portion disposed to project in the radial direction (a portion having a local maximum value of a radial dimension) is formed as narrow as possible within the limit that can be achieved in machining, and practically means that the portion is formed into a shape such as those visually recognized as a line without a width dimension when observed with a loupe (magnifying glass) etc.

In FIG. 3, a position corresponding to an effective diameter (a diameter of a virtual cylinder acquired when a width of a thread groove is equal to a width between screw threads) is indicated by broken lines for the screw thread 16 at the center. This effective diameter is preferably measured by a well-known three-wire method etc. The margin portion 18 is preferably formed into a ridge line shape with a width dimension of zero in a range from the thread bottom 30 of the screw thread 16 to the prescribed position between the thread bottom 30 and the effective diameter position of the screw thread 16 in the flank 28. The example depicted in FIG. 3 exemplarily illustrates the configuration formed into a ridge line shape with a width dimension of zero in a range from the thread bottom 30 of the screw thread 16 to the effective diameter position of the screw thread 16 in the flank 28. Therefore, the margin portion 18 has the ridge line portion 18b defined from thread bottom 30 to the prescribed position (=the effective diameter position in the example depicted in FIG. 3) and has the mountain ridge portion 18a defined from the prescribed position to the thread top 26. In other words, the ridge line portion 18b is disposed in a portion having a diameter smaller than the effective diameter position of the screw thread 16, and a portion having a diameter at least larger than the effective diameter is defined as the mountain ridge portion 18a in the margin portion 18.

As depicted in FIG. 3, the margin portion 18 is disposed such that the extending direction indicated by the dashed-two dotted line forms the prescribed helix angle β relative to the axial center direction indicated by a dashed-dotted line. The helix angle α corresponds to a twist in the direction opposite to a twist of the screw threads 16 and, for example, if the screw threads 16 are right-hand threads, the helix angle β corresponds to left-hand threads. When a lead angle of the screw threads 16 is α, the helix angle β is preferably set within a range of the lead angle α±0.5α. Therefore, the helix angle β is preferably within a range of $0.5\alpha \leq \beta \leq 1.5\alpha$ when the lead angle of the screw threads 16 is α. More preferably, the helix angle β is equal to the lead angle α of the screw threads 16. Therefore, $\beta=\alpha$ is satisfied. In this case, the extending direction of the margin portion 18 indicated by the dashed-two dotted line of FIG. 3 is configured to be substantially perpendicular to the extending direction of the screw threads 16.

A tapping durability comparison test conducted by the present inventors for verifying the effect of the present invention will then be described. To verify the effect of the present invention, the present inventors created a plurality of types of samples 1 to 7 (thread forming taps) having respective different width dimensions (hereinafter referred to as thread-bottom margin widths) in the thread bottoms 30 of the margin portions 18 and helix angles β of the margin portions 18 (the direction opposite to the twist of the screw threads is indicated by a negative value), and conducted the tapping durability comparison test to compare the durability (tool life). The lead angle α of the screw threads 16 is 3°02' in all the samples used in this test. In this test, tapping was performed by using the samples 1 to 7 depicted in FIG. 4 under the following test conditions, and the formed female threads were checked by using a plug gauge to conduct a test comparing the numbers of holes machined by the respective samples until the plug gauge did not pass through (GP-OUT). Such a test was conducted twice for each of the samples and an average value was calculated from the numbers of machinable holes (the numbers of holes before GP-OUT) in the respective tests. The average value of the numbers of machinable holes of the sample 1 having the helix angle β=0° and the thread-bottom margin width aimed at 1° corresponding to a conventional technique was assumed as 100% to calculate and evaluate, as a durability ratio, a relative ratio of the average value of the number of machinable holes of each of the samples.

[Test Conditions]
Work material: S45C (JIS G 4051)
Size: M10×1.5 (8 lobes)
Biting thread number: 2 threads
Machine used: vertical machining center
Machining speed: 20 m/min (synchronized feed)
Oil: water-soluble cutting oil (diluted ten-fold)
Prepared hole shape: through-hole 20 mm
Prepared hole diameter: ϕ9.26 mm FIG. 4 is a diagram of the helix angle β and the thread-bottom margin width of the samples used in the tapping durability comparison test together with a test result corresponding to each of the samples. As depicted in FIG. 4, in the results from the samples 2 to 4, 6, and 7 corresponding to the thread forming tap 10 of this embodiment having the thread-bottom margin width aimed at 0° (i.e., the thread-bottom margin width made as narrow as possible within the machinable limit), the durability ratio is greater than the sample 1 corresponding to a thread forming tap of the conventional technique with the thread-bottom margin width aimed at 1°, which reveals that the tool life (durability) is increased. Particularly, in the results from the samples 3, 4, and 6 having the thread-bottom margin width aimed at 0° and the helix angle β set within a range of $0.5\alpha \leq \beta \leq 1.5\alpha$ relative to the lead angle α, the durability ratio is made larger by 8% or more as compared to the sample 1, which reveals that the tool life is significantly increased. Moreover, in the result from the sample 4 having the thread-bottom margin width aimed at 0° and the helix angle β set substantially equal to the lead angle α, the durability ratio is made larger by about 15% as compared to the sample 1, which reveals that the tool life is especially increased. On the other hand, in the results from the samples 2 and 7 having the thread-bottom margin width aimed at 0° while the helix angle β is deviated from the range of $0.5\alpha \leq \beta \leq 1.5\alpha$ relative to the lead angle α and the sample 5 having the helix angle β set within the range of $0.5\alpha \leq \beta \leq 1.5\alpha$ relative to the lead angle α while the thread-bottom margin width is aimed at 1°, the increase width of the durability ratio is about 2 to 3% as compared to the sample 1, which reveals that an increase in durability relative to the conventional technique is smaller than the samples 3, 4, 6 etc.

A tapping torque comparison test conducted by the present inventors will then be described. The present inventors created a plurality of types of samples 1 to 5 (thread forming taps) having respective different helix angles β of the margin portions 18 (the direction opposite to the twist of the screw threads is indicated by a negative value), and conducted the tapping torque comparison test to compare the torque in tapping. The lead angle α of the screw threads 16 is 3°02' and the thread-bottom margin width is aimed at 0° in all the samples used in this test. In this test, tapping was performed for five holes by using the samples 1 to 5 depicted in FIG. 5 under the following test conditions, and a peak value of working torque (N·cm) at the time of tapping for each hole was detected. An average value of the working torque corresponding to the first to fifth holes was calculated and the average value of the torque of the sample 1 was assumed as 100% to calculate and evaluate a relative ratio (proportion) of the average value of the torque for each of the samples.

Figures 5, 6:
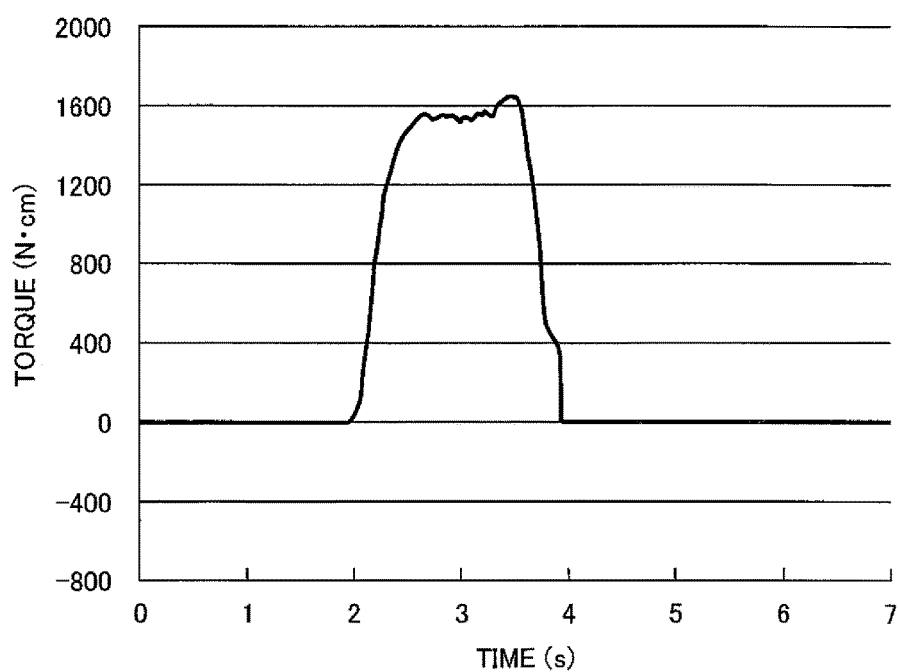
FIG. 5 is a diagram of helix angles of samples used in a tapping torque comparison test conducted by the present inventors together with a test result corresponding to each of the samples.
FIG. 6 is a graph of a torque waveform shape at the time of tapping with the sample 1 used in the tapping torque comparison test depicted in FIG. 5.

[Test Conditions]
Work material: S45C (JIS G 4051)
Size: M10×1.5
Biting thread number: 5 threads
Machine used: vertical machining center
Machining speed: 10 m/min
Oil: chlorine-free water-insoluble cutting oil
Prepared hole shape: through-hole 20 mm
Prepared hole diameter: ϕ9.24 mm FIG. 5 is a diagram of the helix angle β of the samples used in the tapping torque comparison test together with a test result corresponding to each of the samples. As depicted in FIG. 5, it is revealed that the samples 2 to 4 having the helix angle β of the margin portion 18 set within the range of $0.5\alpha \leq \beta \leq 1.5\alpha$ relative to the lead angle α suppress the average value of the working torque lower than the sample 1 having the helix angle β set to zero. The possible reason is that since the margin portion 18 is twisted in the direction opposite to the lead angle α of the screw threads 16 relative to the axial center C, a contact area with the work is made smaller at the time of tapping and the working torque is accordingly reduced. On the other hand, it is revealed that the sample 5 having the helix angle β of the margin portions 18 about twice (=2α) as large as the lead angle α disadvantageously makes the average value of the working torque larger than the sample 1 having the helix angle β set to zero. Therefore, it is verified that if a twist in the direction opposite to the lead angle α of the margin portions 18 becomes larger and deviates from a prescribed range, the working torque at the time of tapping disadvantageously becomes larger, resulting in a reduction in tool life (durability) as apparent from the test results described with reference to FIG. 4.

Figure 7:
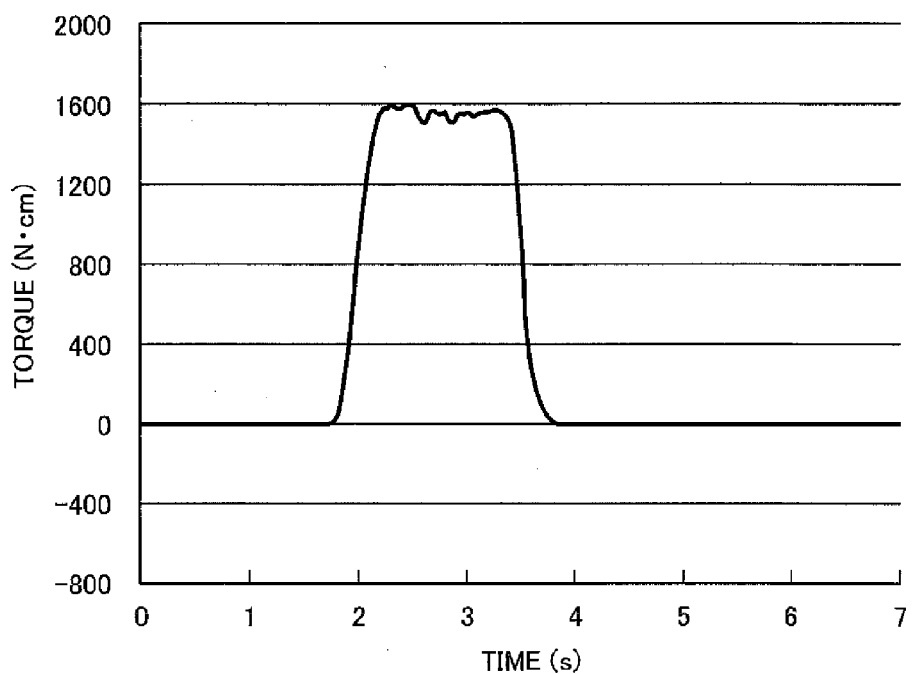
FIG. 7 is a graph of a torque waveform shape at the time of tapping with the sample 3 used in the tapping torque comparison test depicted in FIG. 5.
Figure 8:
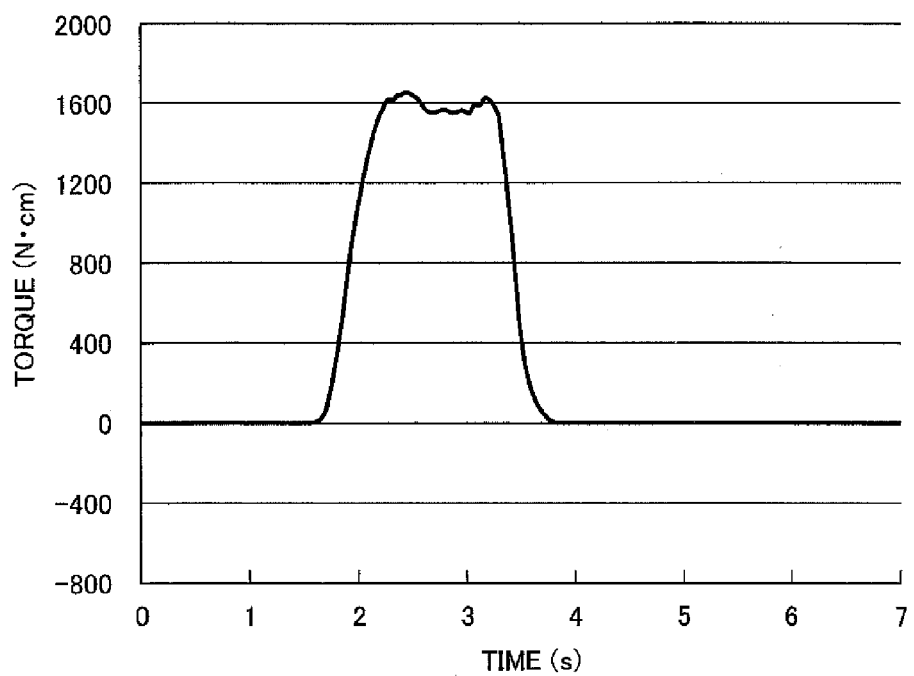
FIG. 8 is a graph of a torque waveform shape at the time of tapping with the sample 5 used in the tapping torque comparison test depicted in FIG. 5.

FIGS. 6 to 8 are graphs of torque waveform shapes at the time of tapping with the respective samples 1, 3, and 5 used in the tapping torque comparison test, and FIGS. 6, 7, and 8 depict the torque waveform shape of the sample 1, the torque waveform shape of the sample 3, and the torque waveform shape of the sample 5, respectively. In FIGS. 6 to 8, torque during returning (reversal) of the thread forming tap 10 after the tapping is not depicted. As depicted in FIG. 6, the torque waveform shape at the time of tapping with the sample 1 indicates that after the formation of female threads is started with the tap portion 14 and the torque increases to about 1550 (N·cm), the torque is maintained substantially constant; however, the torque increases to about 1650 (N·cm) and reaches the peak value (maximum value) near the end of machining. As depicted in FIG. 7, the torque waveform shape at the time of tapping with the sample 3 indicates that after the formation of female threads is started with the tap portion 14 and the torque increases to about 1600 (N·cm), the torque is maintained substantially constant until the end of the machining. Therefore, the peak value of the torque is also about 1600 (N·cm). As depicted in FIG. 8, the torque waveform shape at the time of tapping with the sample 5 indicates that after the formation of female threads is started with the tap portion 14 and the torque increases to about 1650 (N·cm) and reaches the peak value, the torque once decreases to about 1550 (N·cm) and then increases to about 1630 (N·cm) near the end of machining. As compared to the torque waveform shapes depicted in FIGS. 6 and 7, the torque continuously maintains a value of about 1600 (N·cm) for a longer time. As described above, comparing the torque waveform shapes of FIGS. 6 to 8, it can be said that in the tapping with the sample 3 having the helix angle β of the margin portions 18 set within the range of $0.5\alpha \leq \beta \leq 1.5\alpha$ relative to the lead angle α (the helix angle β set substantially equal to the lead angle α), the torque is stable throughout the machining and the torque can be most reduced.

Second Embodiment

Another preferred embodiment of the present invention will be described in detail with reference to the drawings. In the following description, the portions common to the embodiments are denoted by the same reference numerals and will not be described.

Figure 9:
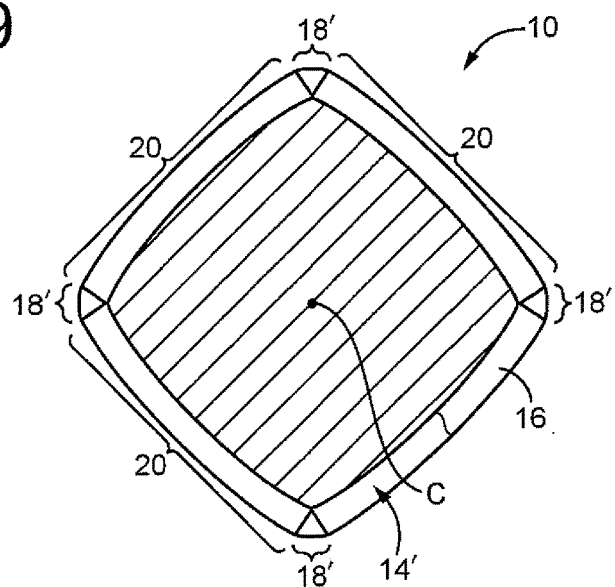
FIG. 9 is a cross-sectional view when a portion of another tap portion included in the thread forming tap depicted in FIG. 1 is cut by a plane including the axial center for explaining a configuration thereof.
Figure 10:
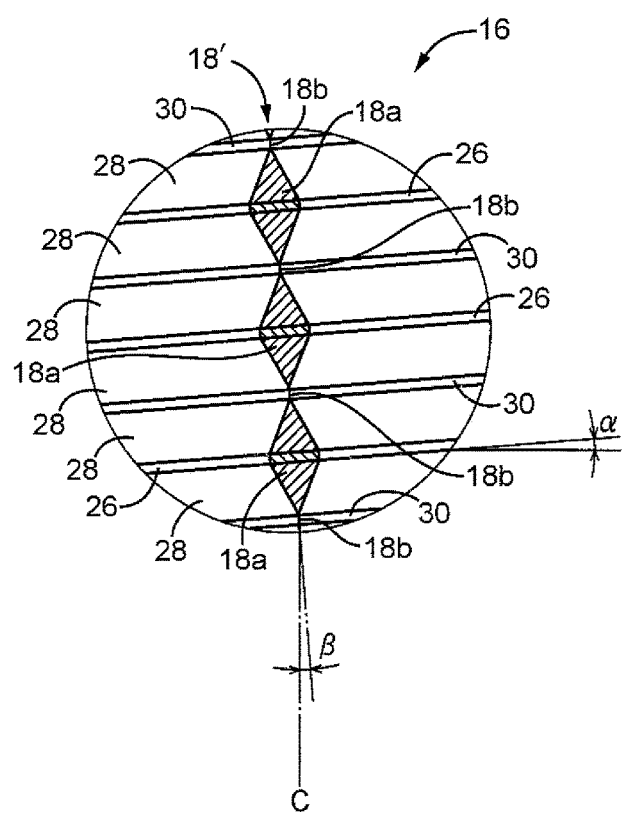
FIG. 10 is an enlarged front view of a portion of the screw threads of the tap portion depicted in FIG. 9 for explaining a configuration thereof in detail.

FIG. 9 is a cross-sectional view when a portion of another tap portion 14' included in the thread forming tap 10 is cut by a plane including the axial center C (a cross-sectional view taken along II-IT depicted in FIG. 1) for explaining a configuration thereof. FIG. 10 is an enlarged front view of a portion of the screw threads 16 of the tap portion 14' for explaining a configuration thereof in detail. As depicted in FIGS. 9 and 10, in the tap portion 14' included in the thread forming tap 10 of this embodiment, a margin portion 18' of the screw thread 16 is formed into a ridge line shape with a width dimension of zero at a thread bottom of the screw thread 16 and is formed to have a width dimension in the remaining portion. Therefore, the margin portion 18' has the mountain ridge portion 18a defined from the thread top 26 to a boundary portion with the thread bottom 30 in the flank 28 with a width dimension in a direction perpendicular to an extending direction of the margin portion 18 (direction indicated by a dashed-two dotted line of FIG. 3) and has the ridge line portion 18b defined at the thread bottom 30 without a width dimension (with a width dimension of zero) in a direction perpendicular to the extending direction of the margin portion 18. This configuration can suppress a contact area with the work smaller at the time of machining and produces a certain level of the effect of the present invention.

As described above, according to this embodiment, the thread forming tap 10 includes the screw threads 16 formed into a male thread shape with the margin portions 18, 18' disposed to project in a radial direction and the relief portions 20 having a diameter smaller than the margin portions 18, 18' alternatively arranged and causes the margin portions 18, 18' of the screw threads 16 to cut into a surface layer portion of a prepared hole formed in a work to plastically deform the surface layer portion so as to form female threads, and the margin portions 18, 18' are formed into a ridge line shape with a width dimension of zero at least at the thread bottom 30 of the screw threads 16 and, therefore, a contact area with a work can be suppressed smaller at the time of machining to realize a reduction in working torque and an increase in tool life. Thus, the thread forming tap 10 reducing the working torque and increasing the tool life can be provided.

Since the margin portions 18, 18' are formed into a ridge line shape with a width dimension of zero in a range from the thread bottom 30 of the screw threads 16 to the prescribed position between the thread bottom 30 and the effective diameter position of the screw threads 16, a contact area with a work can further be suppressed smaller at the time of machining to realize a reduction in working torque and an increase in tool life in a practical form.

Since the margin portions 18, 18' are disposed with the helix angle β in the direction opposite to the twist of the screw threads 16 relative to the axial center C of the screw threads 16 and the helix angle β is within a range of $0.5\alpha \leq \beta \leq 1.5\alpha$ when the lead angle of the screw threads is α, a contact area with a work can further be suppressed smaller at the time of machining to realize a reduction in working torque and an increase in tool life in a practical form.

Since the helix angle β is equal to the lead angle α of the screw threads 16, a contact area with a work can further be suppressed smaller at the time of machining to realize a reduction in working torque and an increase in tool life in a practical form.

Although the preferred embodiments of the present invention have been described in detail with reference to the drawings, the present invention is not limited thereto and is implemented with various modifications applied within a range not departing from the spirit thereof.

NOMENCLATURE OF ELEMENTS

10: thread forming tap 12: shank portion 14, 14': tap portion 16: screw thread 18, 18': margin portions 18a: mountain ridge portion 18b: ridge line portion
20: relief portions 22: chamfer portion 24: complete thread portion 26: thread top
28: flank 30: thread bottom C: axial center α: lead angle β: helix angle

The invention claimed is:

1. A thread forming tap including a screw thread formed into a male thread shape with margin portions disposed to project in a radial direction and relief portions having a diameter smaller than the margin portions, the margin portions and the relief portions being alternatively arranged and, the thread forming tap causing the margin portions of the screw thread to cut into a surface layer portion of a prepared hole formed in a work to plastically deform the surface layer portion so as to form a female thread,
   the margin portions being formed into a ridge line shape with a width dimension of zero at least at a thread bottom of the screw thread, and
   the margin portions being formed into the ridge line shape with the width dimension of zero in a range from the thread bottom of the screw thread to a prescribed position between the thread bottom and an effective diameter position of the screw thread.

2. The thread forming tap of claim 1, wherein the margin portions are disposed with a helix angle β in a direction opposite to a twisting direction of the screw thread relative to an axial center of the screw thread, and wherein the helix angle β is within a range of $0.5\alpha \leq \beta \leq 1.5\alpha$ when a lead angle of the screw thread is α.

3. The thread forming tap of claim 2, wherein the helix angle β is equal to the lead angle α of the screw thread.

4. The thread forming tap of claim 1,
   wherein the screw thread is formed along a helix about an axis of the thread forming tap, and
   wherein a tangent to the helix is inclined with respect to a plane perpendicular to the axis of the thread forming tap.

5. The thread forming tap of claim 1, wherein the width dimension of the margin portions at a thread top of the screw thread is larger than the width dimension of the margin portions in the range from the thread bottom to the prescribed position.

6. The thread forming tap of claim 1, further comprising a tap portion provided with the screw thread, and a shank portion contiguous to the tap portion in an axial direction that is a direction parallel to an axis of the thread forming tap,
   wherein the tap portion has, in a cross section perpendicular to the axial direction, a generally polygonal shape with rounded corners,
   wherein the margin portions and the relief portions are alternatively arranged in a helical direction about the axis, such that ones of the margin portions are located in a position corresponding to each one of the rounded corners and are arranged in a margin-portion arrangement direction inclined with respect to the axis, and wherein the width dimension of the margin portions is a width of each of the margin portions that is measured in a direction perpendicular to the margin-portion arrangement direction.

7. The thread forming tap of claim 1, wherein the width dimension of the margin portions at a thread top is larger than the width dimension in the range from the thread bottom to the prescribed position, wherein the thread forming tap includes a tap portion provided with a screw thread, and a shank portion contiguous to the tap portion in an axial direction that is a direction parallel to an axis of the thread forming tap, wherein the tap portion has, in a cross section perpendicular to the axial direction, a generally polygonal shape with rounded corners, wherein the margin portions and the relief portions are alternatively arranged in a helical direction about the axis, such that ones of the margin portions are located in a position corresponding to each one of the rounded corners and are arranged in a margin-portion arrangement direction inclined with respect to the axis, and wherein the width dimension of the margin portions is a width of each of the margin portions that is measured in a direction perpendicular to the margin-portion arrangement direction.

* * * * *